United States Patent
Wildsmith et al.

(10) Patent No.: US 9,405,131 B2
(45) Date of Patent: Aug. 2, 2016

(54) METHOD AND APPARATUS FOR PROVIDING VARIATIONS OF A LOWER-LID CONTACT SURFACE AND UNDER-LID SUPPORT STRUCTURES OF A TRANSLATING MULTIFOCAL CONTACT LENS

(71) Applicant: Johnson & Johnson Vision Care, Inc., Jacksonville, FL (US)

(72) Inventors: Christopher Wildsmith, Jacksonville, FL (US); Michael Widman, Jacksonville, FL (US); Jonathan P. Adams, Jacksonville, FL (US)

(73) Assignee: Johnson & Johnson Vision Care, Inc, Jacksonville, FL (US)

( * ) Notice: Subject to any disclaimer, the term of this patent is extended or adjusted under 35 U.S.C. 154(b) by 215 days.

(21) Appl. No.: 13/854,642

(22) Filed: Apr. 1, 2013

(65) Prior Publication Data

US 2013/0258274 A1    Oct. 3, 2013

Related U.S. Application Data

(60) Provisional application No. 61/617,797, filed on Mar. 30, 2012.

(51) Int. Cl.
| | |
|---|---|
| *G02C 7/00* | (2006.01) |
| *G02C 7/04* | (2006.01) |
| *B29D 11/00* | (2006.01) |
| *B29C 67/00* | (2006.01) |
| *B29C 35/08* | (2006.01) |

(52) U.S. Cl.
CPC ............ *G02C 7/043* (2013.01); *B29C 67/0066* (2013.01); *B29D 11/00028* (2013.01); *B29D 11/00144* (2013.01); *G02C 7/048* (2013.01); *B29C 2035/0833* (2013.01)

(58) Field of Classification Search
CPC .............. G02C 7/00; G02C 7/04; G02C 7/24; G02C 7/25; G02C 7/26; G02C 7/27; G02C 7/28
See application file for complete search history.

(56) References Cited

U.S. PATENT DOCUMENTS

| | | | |
|---|---|---|---|
| 8,317,505 B2 | 11/2012 | Widman et al. | |
| 8,318,055 B2 | 11/2012 | Widman et al. | |

(Continued)

FOREIGN PATENT DOCUMENTS

| | | |
|---|---|---|
| EP | 0624811 | 9/1997 |
| WO | WO 03/009052 | 1/2003 |
| WO | WO 2006/013101 | 2/2006 |
| WO | WO 2009025845 | 2/2009 |
| WO | WO 2009025848 | 2/2009 |

OTHER PUBLICATIONS

European Search Report dated Jul. 9, 2013 for corresponding Patent Application No. EP13161808.

*Primary Examiner* — Ricky Mack
*Assistant Examiner* — Robert E Tallman

(57) ABSTRACT

The present invention discloses a translating multifocal contact Lens including one or both of a lower-lid contact surface and an under-lid support structure. More specifically, a translating multifocal contact Lens whereby a lower-lid contact surface may include multiple geometric variations and Blend Zones, and an under-lid support structure that may be designed based upon one or more various techniques including one or more of a function-driven technique, a uniform axial thickness technique, a uniform radial thickness technique, and a MES technique.

6 Claims, 8 Drawing Sheets

(56) References Cited

U.S. PATENT DOCUMENTS

| | | | |
|---|---|---|---|
| 8,911,079 B2 * | 12/2014 | Roffman et al. | 351/159.19 |
| 2004/0017542 A1 * | 1/2004 | Lindacher et al. | 351/160 R |
| 2004/0263776 A1 | 12/2004 | Ezekiel | |
| 2005/0099595 A1 | 5/2005 | Lindacher | |
| 2009/0174863 A1 * | 7/2009 | Widman et al. | 351/163 |
| 2010/0171924 A1 | 7/2010 | Perrin | |
| 2012/0075581 A1 * | 3/2012 | Roffman et al. | 351/161 |

* cited by examiner

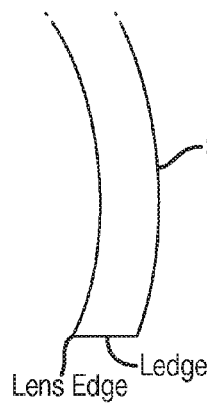
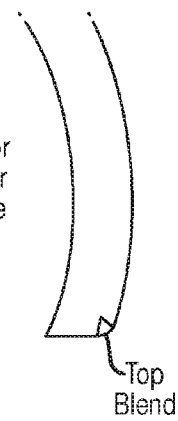
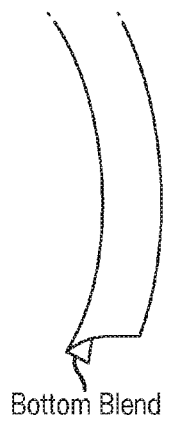
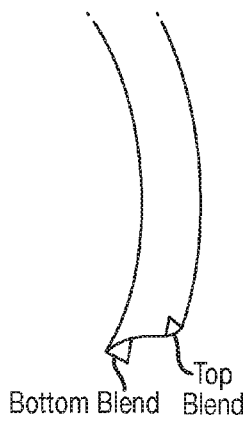
FIG. 1A    FIG. 1B    FIG. 1C    FIG. 1D
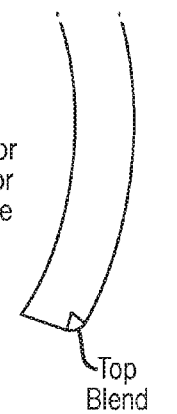
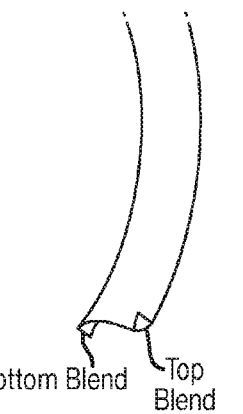
FIG. 2A    FIG. 2B    FIG. 2C    FIG. 2D
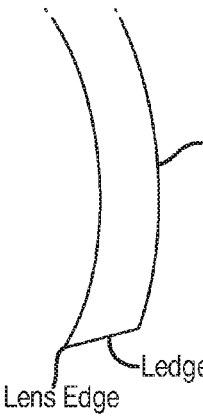
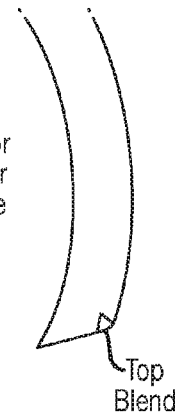
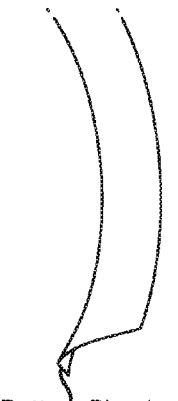
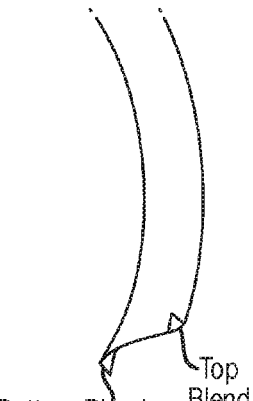
FIG. 3A    FIG. 3B    FIG. 3C    FIG. 3D

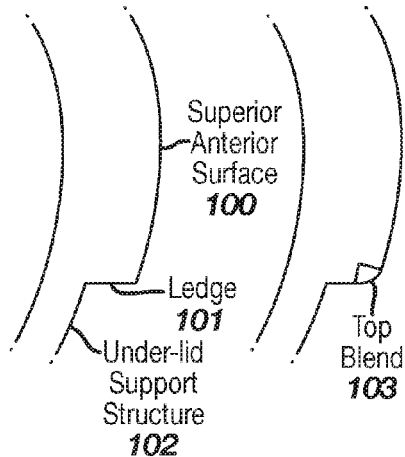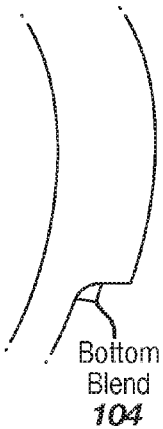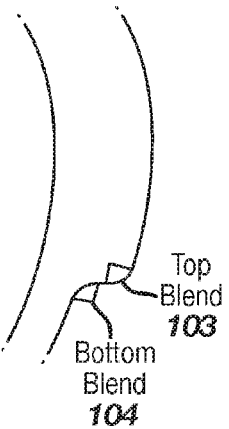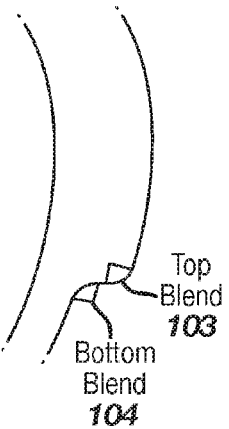
FIG. 8A    FIG. 8B    FIG. 8C    FIG. 8D
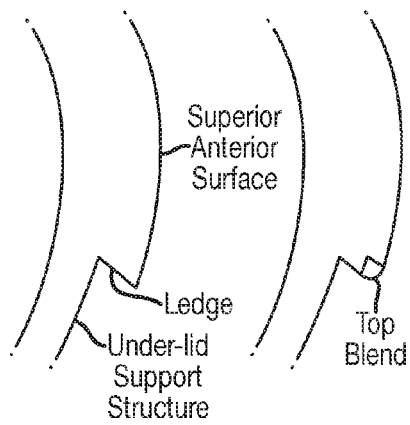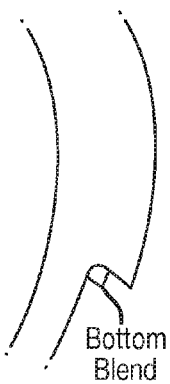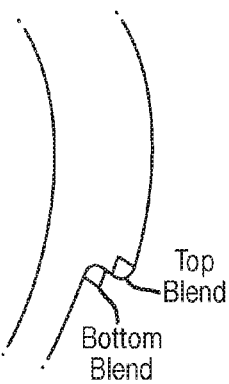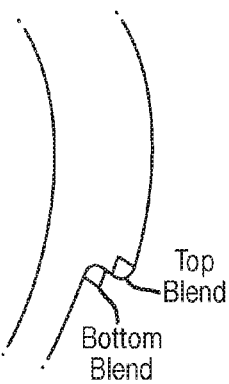
FIG. 9A    FIG. 9B    FIG. 9C    FIG. 9D
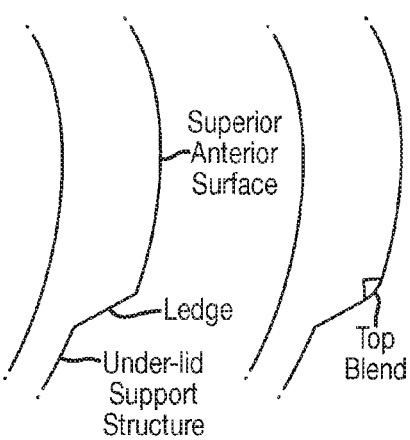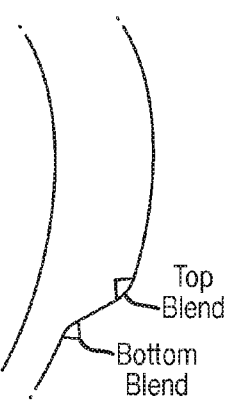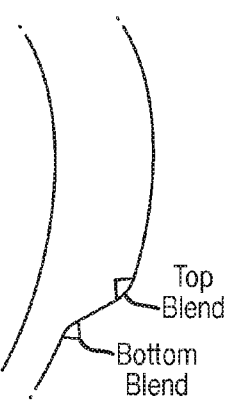
FIG. 10A    FIG. 10B    FIG. 10C    FIG. 10D

METHOD AND APPARATUS FOR PROVIDING VARIATIONS OF A LOWER-LID CONTACT SURFACE AND UNDER-LID SUPPORT STRUCTURES OF A TRANSLATING MULTIFOCAL CONTACT LENS

CROSS REFERENCE TO RELATED APPLICATIONS

This application claims priority to the U.S. Provisional Application No. 61/617797, filed Mar. 30, 2012, the contents of which are relied upon and incorporated herein.

FIELD OF USE

This invention relates to contact Lenses and more specifically, to a translating multifocal contact Lens comprising one or both of a lower-lid contact surface and an under-lid support structure wherein, there may be multiple variations of a lower-lid contact surface and multiple techniques to design an under-lid support structure that fall within the present invention.

BACKGROUND OF THE INVENTION

Bifocal lenses are comprised of two or more areas, or zones, with different optical powers, including typically a far-power Optic Zone for distance vision, and a near-power Optic Zone for near or close up vision. The two zones may be subdivided into additional power zones in which case a lens may be called a multifocal lens.

Effective use of a bifocal contact lens requires translation of an ocular system between vision surfaces when an eye changes from gazing at an object at a distance to gazing at a nearby object. Alternatively, there may be a desire to have a translating multifocal contact lens that may have one or more intermediate-power zones in addition to far and near-power Optic Zones. Such a translating contact lens may have to have an ability to control and optimize the amount of movement of a lens when the pupil translates from distance vision, to intermediate vision, to near vision, or any combination thereof.

While there are many designs for soft translating contact lenses, soft contact lenses have difficulty translating across the surface of an eye when the visual direction of an eye changes from a straight-ahead gaze, to a downward gaze. In one prior art example, describes a soft bifocal contact lens that has an integrally formed bevel to aid translation of a lens. While other designs may have the capability to translate across the surface of an eye when the visual direction of an eye changes from a straight-ahead gaze, to a downward gaze, but are not very efficient at controlling movement of a lens during an eye's translation to a different visual direction. Another prior art example, describes a soft multifocal contact lens that has an integrally formed ramped ridge zone adjoining an outwardly extending latitudinal ridge that sits on an eyelid to aid in translation of a lens. The latitudinal ridge portion has a bump at each end, thereby increasing elevation height of the ends of the ridge compared to the elevation height in the middle. Another disadvantage of the prior art is discomfort when worn upon an eye.

Therefore, there is a need for a soft translating multifocal contact lens that provides various design options and is capable of limiting the amount of translation across the surface of an eye when an eye changes position from one Optic Zone to another while also providing wearers with improved comfort.

SUMMARY

Accordingly, one aspect of this invention provides a translating multifocal contact lens resulting in limited lens translocation relative to the pupil of an eye. The limited translocation may be based upon one or both of vertical stability and rotational stability when using near, intermediate, and distance vision. In some embodiments, the present invention may include both, of a lower-lid contact surface and an under-lid support structure. In some other embodiments, the present invention may include a lower-lid contact surface, and no under-lid support structure. More specifically, the present invention discloses a translating multifocal contact lens including multiple variations of a lower-lid contact surface and various techniques that may be implemented to design an under-lid support structure. Free-form technology enables many previously unobtainable shapes and forms including non-spherical. The voxel by voxel formation essentially, allows for a great variety of shapes formable on a substrate

BRIEF DESCRIPTIONS OF DRAWINGS

FIGS. 1A-1D illustrate examples of the present invention having a lower-lid contact surface with zero slope adjoining a Lens Edge and anterior surface, and multiple variations of Blend Zones between them.

FIGS. 2A-2D illustrate examples of the present invention having a lower-lid contact surface with negative slope adjoining a Lens Edge and anterior surface, and multiple variations of Blend Zones between them.

FIGS. 3A-3D illustrate examples of the present invention having a lower-lid contact surface with positive slope adjoining a Lens Edge and anterior surface, and multiple variations of Blend Zones between them.

FIGS. 8A-8D illustrate examples of the present invention having a lower-lid contact surface with a zero slope adjoining an under-lid support structure and anterior surface, and multiple variations of Blend Zones between them.

FIGS. 9A-9D illustrate examples of the present invention having a lower-lid contact surface with a negative slope adjoining an under-lid support structure and anterior surface, and multiple variations of Blend Zones between them.

Figure 11:
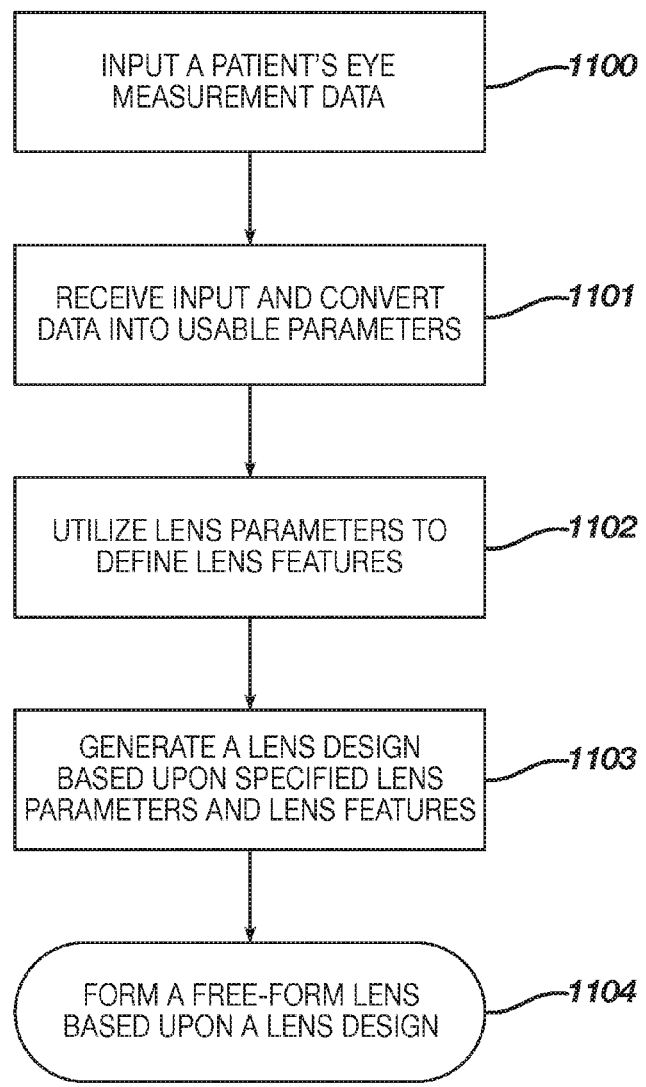
Figure 12:
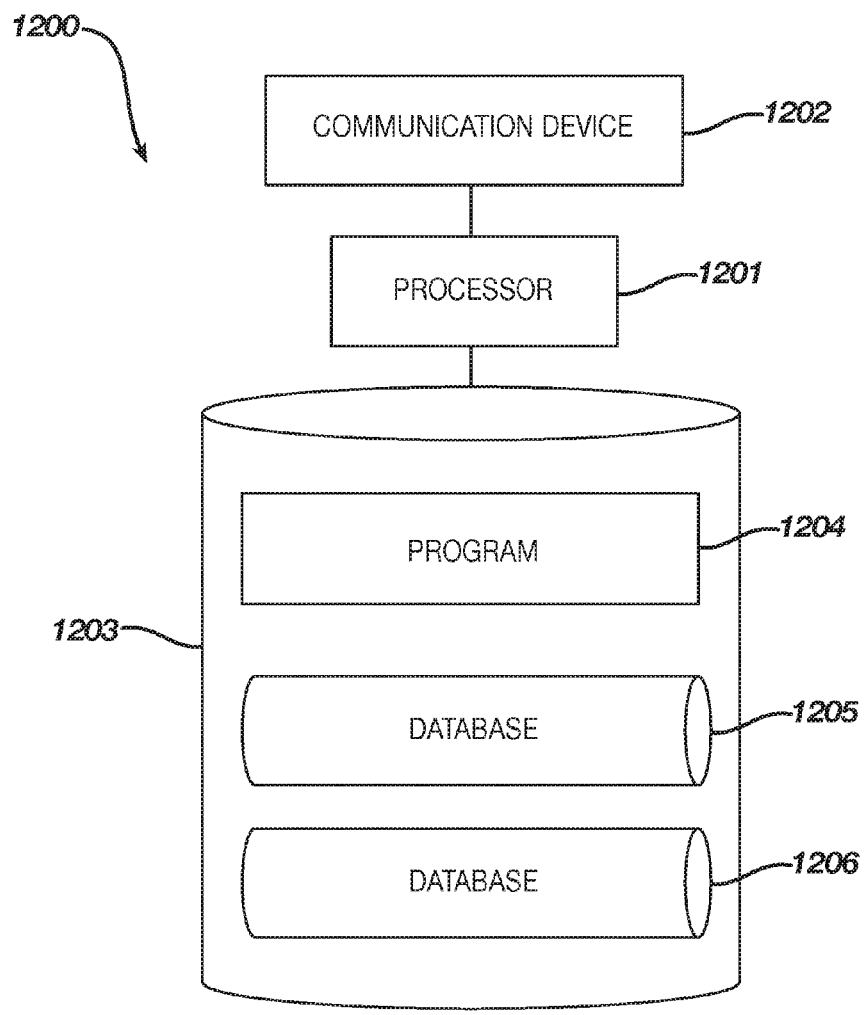

FIGS. 10A-10D illustrate examples of the present invention having a lower-lid contact surface with a positive slope adjoining an under-lid support structure and anterior surface, and multiple variations of Blend Zones between them. FIG. 11 illustrates method steps according to some additional aspect of the present invention. FIG. 12 illustrates a processor that may be used to implement some embodiments of the present invention.

DETAILED DESCRIPTION OF INVENTION

The present invention provides for a translating multifocal contact Lens including one or both of a lower-lid contact surface and an under-lid support structure in accordance with a particular patient's eye data. A preferred embodiment of the present invention includes a Free-formed, translating multifocal contact lens including multiple variations of a lower-lid contact surface, and various techniques for designing an under-lid support structure, as is discussed more fully below in relation to the various figures.

In the following sections, detailed descriptions of embodiments of the invention are given. The description of both preferred and alternative embodiments though thorough are exemplary embodiments only, and it is understood to those skilled in the art that variations, modifications and alterations may be apparent. It is therefore to be understood that said exemplary embodiments do not limit the broadness of the aspects of the underlying invention. Method steps described herein are listed in a logical sequence in this discussion. However, this sequence in no way limits the order in which they may be implemented unless specifically stated. In addition, not all of the steps are required to implement the present invention and additional steps may be included in various embodiments of the present invention.

Glossary

In this description and claims directed to the presented invention, various terms may be used for which the following definitions will apply:

"Blend Zone" as used herein means a contiguous area that blends a portion of a Lens to another adjoining portion of a Lens.

"DMD Show" as used herein, refers to a collection of time based instructional data points that may be used to control activation of mirrors on a DMD, and enable a Lens or Lens Precursor or Lens Precursor Form or Lens Precursor Feature(s) to be fabricated. A DMD Show may have various formats, with (x,y,t), and (r, θ, t) being the most common where, for example "x" and "y" are Cartesian coordinate locations of DMD mirrors, "r" and "θ" are Polar coordinate locations of DMD mirrors, and "t" represents time instructions controlling DMD mirror states. DMD Shows may contain data associated with a regularly or irregularly spaced grid.

"End Point" as used herein, refers to a location that may be specified when implementing one or more of various techniques including one or more of a uniform radial thickness technique, a uniform axial thickness technique, a non-uniform radial thickness technique, a non-uniform axial thickness technique, and a Minimal Energy Surface technique. There may be one or multiple End Points specified on one or both of an anterior surface and a posterior surface, and may be specified by a variety of means known to those skilled in the art. In some embodiments, for example, an End Point location may be specified by one or more of a distance from a center of a lens, a distance from a Lens Edge, positions in (x,y,z) Cartesian coordinate space, and positions in (r, theta) polar coordinate space. Additionally, in some embodiments, End Point locations may be determined based upon one or more of a patient's eye data, a known averaged patient eye data, and general Lens Design principles.

"Fluent Lens Reactive Media" as used herein means a Reactive Mixture that is flowable in either its native form, reacted form, or partially reacted form and, a portion or all Reactive Media may be formed upon further processing into a part of an ophthalmic lens.

"Free-form" as used herein "free-formed" or "free-form" refers to a surface that is formed by crosslinking of a Reactive Mixture via exposure to actinic radiation on a voxel by voxel basis, with or without a fluent media layer, and is not shaped according to a cast mold, lathe, or laser ablation. Detailed description of Free-form methods and apparatus are disclosed in U.S. patent application Ser. No. 12/194,981 and in U.S. patent application Ser. No. 12/195,132.

"Lens" as used herein "lens" refers to any ophthalmic device that resides in or on the eye. These devices may provide optical correction or may be cosmetic. For example, the term lens may refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

"Lens Design" as used herein, refers to form, function or both of a desired Lens, which if fabricated, may provide optical power correction, acceptable Lens fit (e.g., corneal coverage and movement), acceptable Lens rotation stability, etc. Lens Designs may be represented in either a hydrated or un-hydrated state, in Flat or Curved Space, in 2-dimensional or 3-dimensional space, and by a method including but not limited to, geometric drawings, power profile, shape, features, thicknesses etc. Lens Designs may contain data associated with a regularly or irregularly spaced grid.

"Lens Edge" as used herein, refers to a feature to provide a well-defined edge around a perimeter of a Lens Precursor or a Lens that may contain Fluent Lens Reactive Media. A Lens Edge feature may be either continuous around a Lens Precursor or a Lens, or may be present in discrete, non-continuous zones.

"Lens Precursor" as used herein, means a composite object consisting of a Lens Precursor Form and Fluent Lens Reactive Media in contact with a Lens Precursor Form that may be rotationally symmetrical or non-rotationally symmetrical. For example, in some embodiments Fluent Lens Reactive Media may be formed in the course of producing a Lens Precursor Form within a volume of Reactive Mixture. Separating a Lens Precursor Form and Fluent Lens Reactive Media from a volume of Reactive Mixture used to produce a Lens Precursor Form may generate a Lens Precursor. Additionally, a Lens Precursor may be converted to a different entity by either the removal of an amount of Fluent Lens Reactive Media or the conversion of an amount of Fluent Lens Reactive Media into non-fluent incorporated material.

"Lens Precursor Feature", also referred to as "feature", as used herein, refers to a non-fluent substructure of a Lens Precursor Form, and acts as an infrastructure for a Lens Precursor. Lens Precursor Features may be defined empirically or described mathematically by control parameters (height, width, length, shape, location, etc.,) may be are fabricated via DMD Show instructions. Examples of Lens Precursor Features may include one or more of the following: a Lens Edge feature, a Stabilization Zone feature, a Smart Floor Volumator feature, an Optic Zone feature, a Moat feature, a Drain Channel feature, etc. Lens Precursor Features may be fabricated using Actinic Radiation Voxels and may be incorporated into an ophthalmic Lens upon further processing.

"Minimal Energy Surface" as used herein, or the term "MES", refers to a free-formed surface created by Fluent Lens Reactive Media formed over Lens Precursor Features, which may be in a minimum energy state. Minimal Energy Surfaces may be smooth and continuous surfaces.

"Optic Zone" as used herein, refers to a feature that provides one or both of a desired optical power and aberration correction of a Lens Precursor or ophthalmic Lens, the geometry of which may be directly dependent on a Target File.

"Reactive Mixture" as used herein, may be interchangeably used with "Lens Forming Mixture"; lens-forming monomer; refers to a monomer or prepolymer material which can be cured and/or crosslinked to form an ophthalmic lens or portion of an ophthalmic lens. Various embodiments can include lens-forming mixtures with one or more additives such as: UV blockers, tints, photoinitiators, or catalysts, and other additives one might desire in an ophthalmic lenses such as, contact or intraocular lenses. "Start Point" as used herein, refers to a location that may be specified when implementing one or more of various techniques including one or more of a uniform radial thickness technique, a uniform axial thickness technique, a non-uniform radial thickness technique, a non-uniform axial thickness technique, and a Minimal Energy Surface technique. There may be one or multiple Start Points specified on one or both of an anterior surface and a posterior surface, and may be specified by a variety of means known to those skilled in the art. In some embodiments, for example, a Start Point location may be specified by one or more of a distance from a center of a lens, a distance from a Lens Edge, positions in (x,y,z) Cartesian coordinate space, and positions in (r, theta) polar coordinate space. Additionally, in some embodiments, Start Point locations may be determined based upon one or more of a patient's eye data, a known averaged patient eye data, and general Lens Design principles.

"Target File", as used herein, refers to data that may represent a Lens Design, a Thickness Map, a Lens Precursor design, a Lens Precursor Form design, a Lens Precursor Feature design, or combinations of the above. A Target File may be represented in either a hydrated or un-hydrated state, in Flat or Curved Space, in 2-dimensional or 3-dimensional space, and by methods including but not limited to, geometric drawings, power profile, shape, features, thicknesses etc. Target Files may contain data associated with a regularly or irregularly spaced grid.

In some embodiments of this invention, a patient's eye measurement data may be obtained utilizing various types of clinical vision equipment and may be used to influence parameters such as, for example, size, shape, amount, and location of physical features that may be included a translating multifocal ophthalmic lens. In some embodiments, physical features included in a lens may be functionally important to aid in lens comfort and fit when upon an eye. Additionally, physical features may be functionally important to aid in one or both of vertical stability and rotational stability by limiting movement of a lens when a pupil's line of sight moves from one Optic Zone to another Optic Zone. In some embodiments, the present invention may include one or both of a lower-lid contact surface and an under-lid support structure.

In one aspect of the present invention, a lower-lid contact surface may include a contiguous, inward extension of an anterior surface portion that extends laterally across an entire anterior lens surface thereby, providing a shelf-like structure that may rest on a lower eyelid. In some embodiments, a lower-lid contact surface may be located directly above an adjoining under-lid support structure. Furthermore, a lower-lid contact surface may take form in a variety of geometric shapes defined by one or both of points and lines with at least one curve to define a surface. Accordingly, in some embodiments, a lower-lid contact surface may be contoured to an exact shape of a patient's lower eyelid that may provide for one or more of a better fit, wearer comfort, vertical stability, rotational stability, and limiting an amount of lens translocation when a wearer changes line of sight from one Optic Zone to another.

Furthermore, in some embodiments, a lower-lid contact surface may be designed including a variety of different geometric shapes and Blend Zones. In some other embodiments, a Blend Zone may comprise a contiguous area blending a portion of a lens to another adjoining portion of a lens. In some additional embodiments, for example, a lower-lid contact surface may adjoin other features of a lens wherein, there may be no Blend Zones present, or there may be one or both of one or multiple of a top Blend Zone and a bottom Blend Zone present.

Referring now to FIGS. 1A-3D, illustrate examples of multiple variations and Blend Zones of a lower-lid contact surface adjoining a Lens Edge, and an anterior surface. In some embodiments, a translating multifocal lens may include a lower-lid contact surface wherein, an under-lid support structure may not be present. In some other embodiments, for example, Blend Zones may blend into one or both of a superior anterior portion of a lens, and a Lens Edge (shown in FIGS. 1A-3D). In some additional embodiments, for example, a lower-lid contact surface may include one or more of a zero slope FIGS. 1A-1D, a negative slope FIGS. 2A-2D, and a positive slope FIGS. 3A-3D.

In another aspect of the present invention, an under-lid support structure that may begin underneath and adjoin a bottom portion of a lower-lid contact surface, and extend to a lower Lens Edge. In preferred embodiments, an under-lid support structure may have a width (w) of 4 mm or less, preferably a width of 2.1 mm. Accordingly, in some embodiments, an under-lid support structure may include an arcuate anterior surface essentially contoured to a surface of an eye. In some embodiments, an under-lid support structure may be contoured to a patient's eye that may provide for a larger surface area and may allow a lens to more readily wrap around a cornea. Additionally, such an under-lid support structure may aid in one or more of improved wearer comfort, vertical stability, and rotational stability for a lens when upon an eye. In some additional embodiments, an under-lid support structure may be designed based upon various techniques, for example, including one or more of a function-driven technique, a uniform axial thickness technique, a uniform radial thickness technique, and a Minimal Energy Surface (MES) technique. Furthermore, in some embodiments, an under-lid support structure may occur across multiple cross-sections of a lens. As illustrated, an under-lid support structure may also include one or more concave or convex curved portions.

Figure 4A:
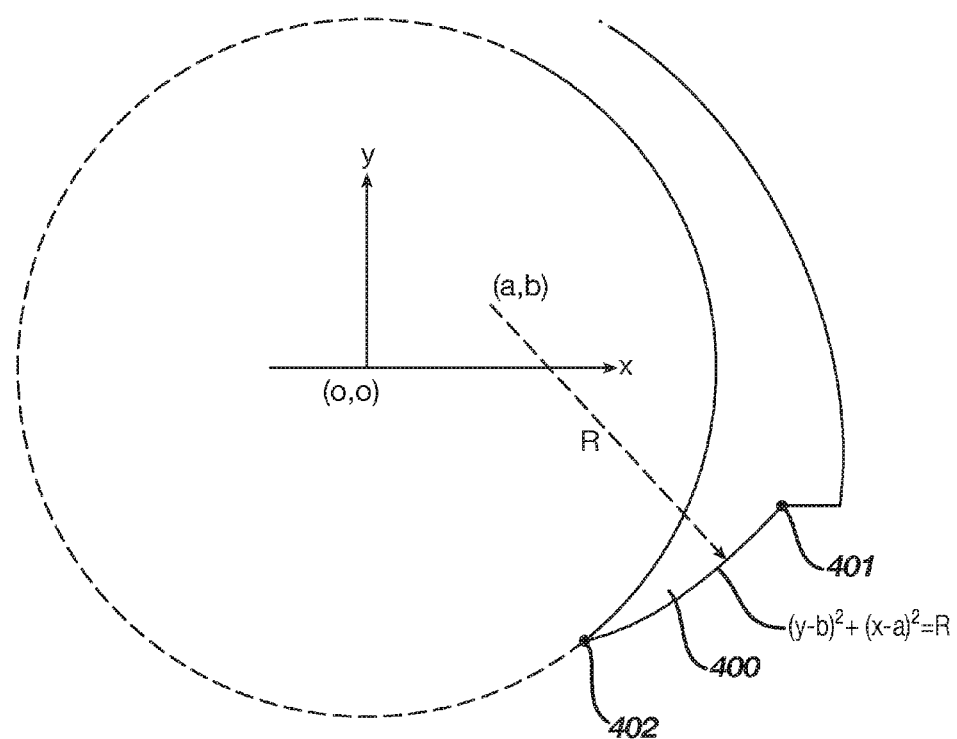
FIGS. 4A-4B illustrate cross-section examples of an under-lid support structure designed via a function-driven technique.
Figure 4B:
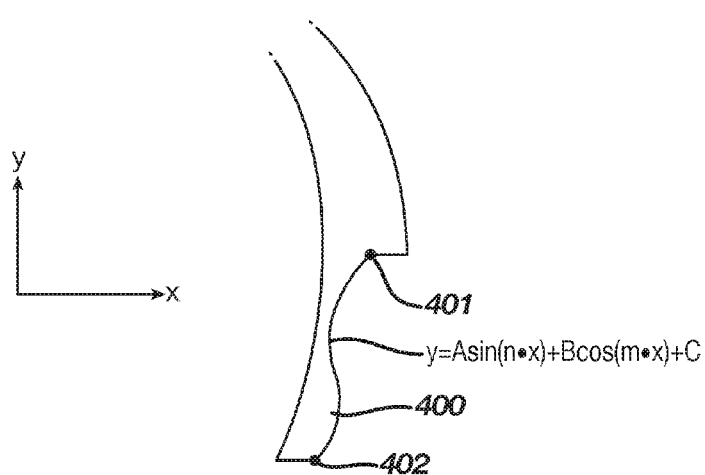

Referring now to FIGS. 4A and 4B, these illustrate cross-section examples of an under-lid support structure 400, designed via a function-driven technique. FIG. 4A illustrates an example of how a curved portion may be described and calculated via a function-driven technique such as, a geometric equation of $(y-b)^2+(x-a)^2=R^2$ that represents curvature between a Start Point 401 and End Point 402 to design an under-lid support structure 400 wherein, (a,b) represents the center of a circle and "R" represents the radius of a circle. FIG. 4B illustrates an example of how a curved portion may be described and calculated a function-driven technique such as, a trigonometric equation of $y=A \sin(n \cdot x)+B \cos(m \cdot x)+C$ that represents curvature between a Start Point 401 and End Point 402 to design an under-lid support structure 400.

More generally, in some embodiments, a function-driven technique may utilize equations that relate y as an f(x) to design an under-lid support structure 400. Accordingly, in some additional embodiments, there may be multiple geometric shapes and variations of an under-lid support structure 400 that fall within the present invention. In some other embodiments, for example, a function-driven technique may be implemented via defining functions based upon a patient's eye data. Furthermore, in some embodiments, implementation of a function-driven technique may result in either uniform thickness or non-uniform thickness variations of an under-lid support structure 400.

Figure 5A:
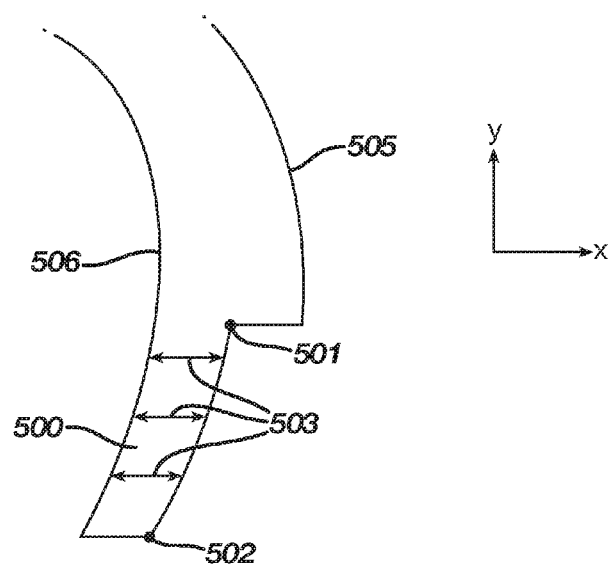
FIGS. 5A-5B illustrate cross-section and plan view examples of an under-lid support structure designed via a fixed, axial uniform thickness technique.
Figure 5B:
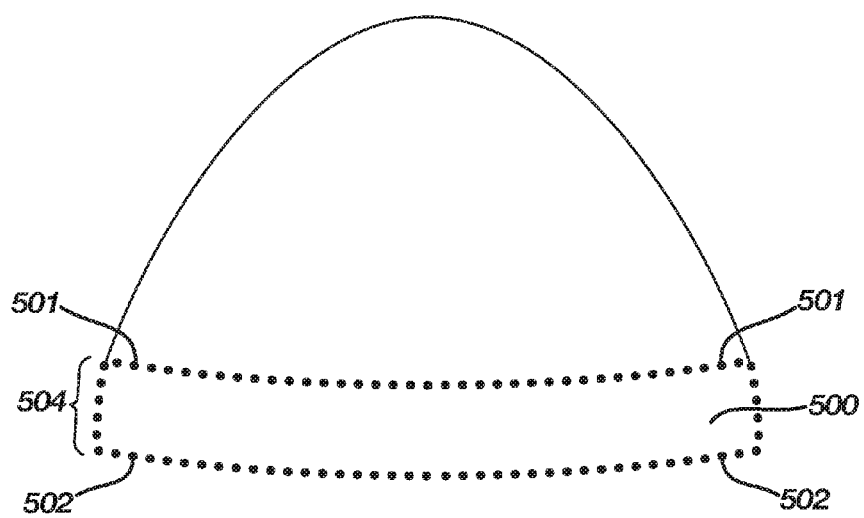

Referring now to FIGS. 5A and 5B, FIG. 5A illustrates a cross-section of a lens illustrating an under-lid support structure 500 designed via a uniform axial thickness technique. FIG. 5B illustrates a plan view of a lens depicting a boundary 504 of an under-lid support structure 500 defined by multiple Start Points 501 and End Points 501 wherein, every axial lens thickness value 503 is identical. In some embodiments, a uniform axial thickness technique may describe a curved portion of an under-lid support structure via specifying one or more of a Start Point 501 location, an End Point 502 location, and a desired axial lens thickness 503 relative to either one of a posterior surface 506 and an anterior surface 505.

Accordingly, in some other embodiments, one or more of a Start Point location 501, an End Point 502 location, and a desired axial thickness 503 may be specified based upon a patient's eye data. Furthermore, in some additional embodiments, combinations of Start Points 501 and End Points 502 may define a boundary 504 including multiple axial lens thickness values 503 each being identical to a desired axial lens thickness 503 (as shown in FIG. 5B) thereby, resulting in a design of an under-lid support structure 500 including a uniform axial thickness.

Figure 6A:
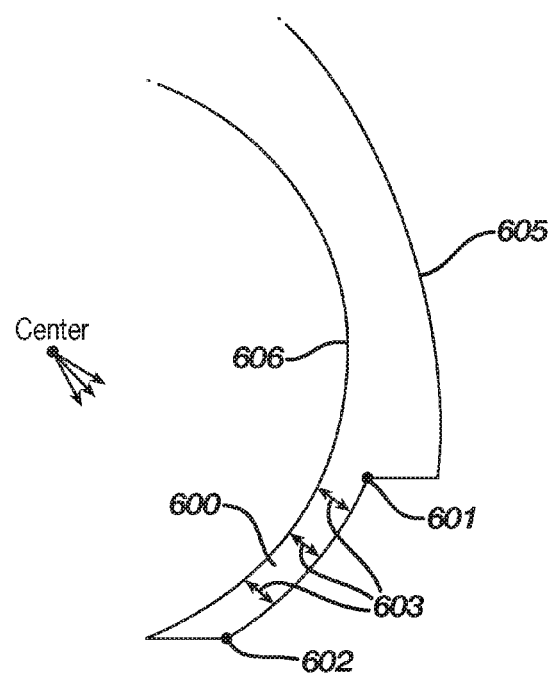
FIGS. 6A-6B illustrate cross-section and plan view examples of an under-lid support structure designed via a fixed, radial thickness technique.
Figure 6B:
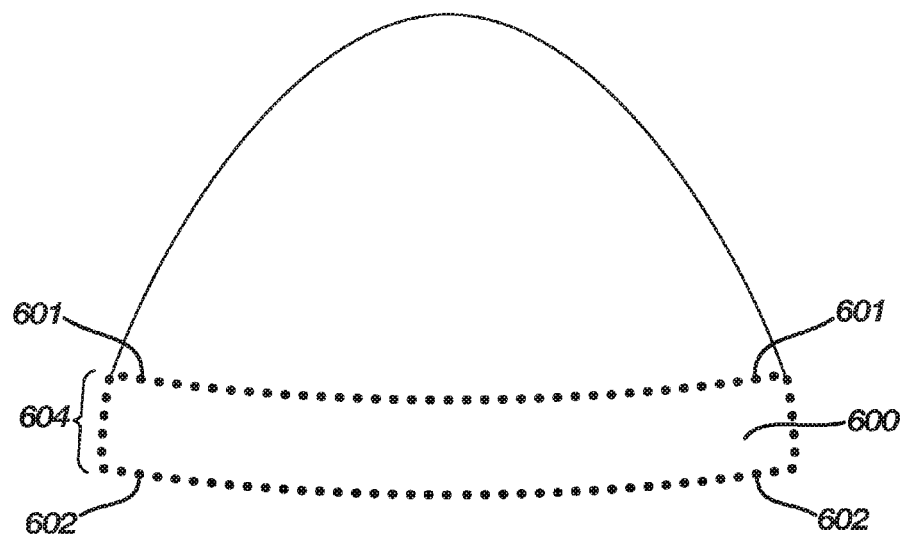

Referring now to FIGS. 6A and 6B, FIG. 6A illustrates a cross-section view of an under-lid support structure 600 designed via a uniform radial thickness technique. FIG. 6B illustrates a plan view of a lens depicting a boundary 604 of an under-lid support structure 600 defined by multiple Start Points 601 and End Points 602 wherein, every radial lens thickness value 603 is identical. In some embodiments, a uniform radial thickness technique may describe a curved portion of an under-lid support structure via specifying one or more of a Start Point 601 location, an End Point 602 location, and a desired radial thickness 603 relative to one or both of a posterior surface 606 and an anterior surface 605. In some preferred embodiments, one or more of a Start Point 601 location, an End Point 602 location, and a desired radial thickness 603 may be relative to a posterior surface 606 that usually includes a shorter arc length, as opposed to an anterior surface 605 that may often result in non-continuous, misleading thickness profiles.

Accordingly, in some other embodiments, one or more of a Start Point 601 location, an End Point 602 location, and a desired radial thickness 603 may be specified based upon a patient's eye data. Furthermore, in some additional embodiments, combinations of Start Points 601 and End Points 602 may define a boundary 604 including multiple radial lens thickness values 603 each being identical to a desired radial lens thickness 603 (as shown in FIG. 6B) thereby, resulting in a design of an under-lid support structure including a uniform radial thickness.

Figure 7A:
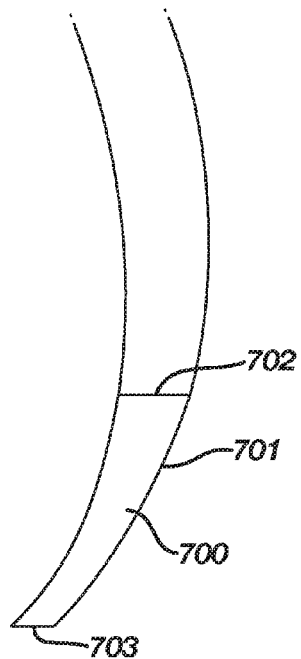
FIGS. 7A-7D illustrate cross-section and plan view examples of an under-lid support structure designed via a MES technique.
Figure 7B:
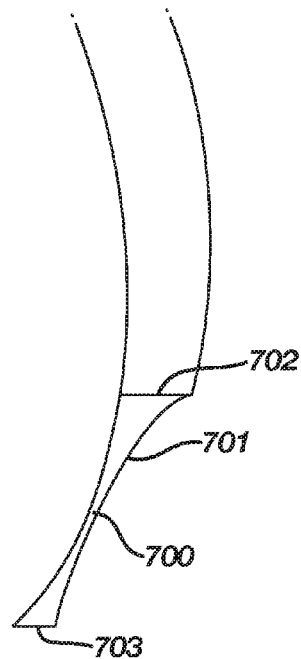
Figure 7C:
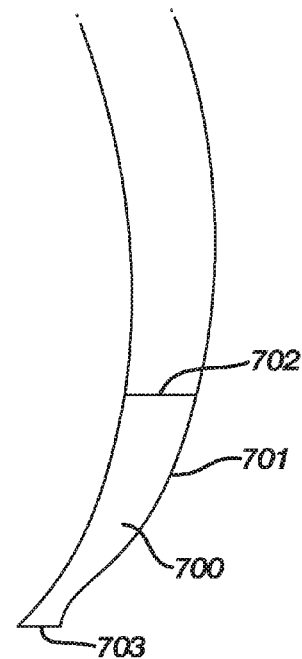
Figure 7D:
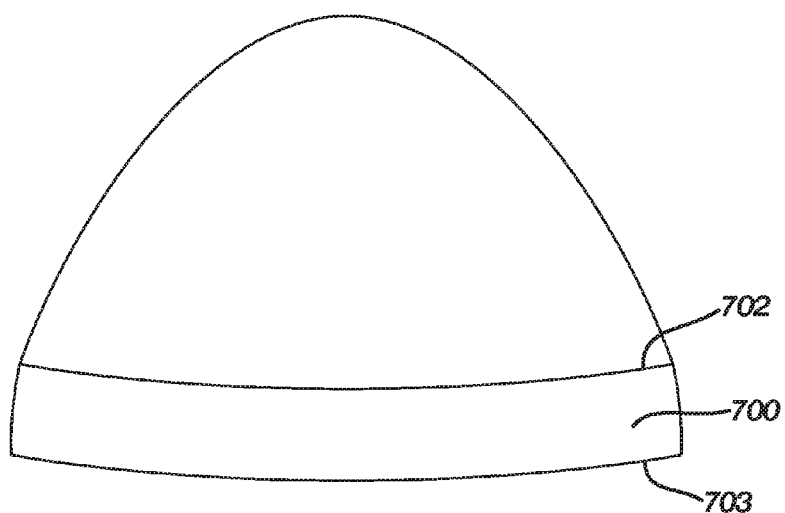

Referring now to FIGS. 7A-7D, FIGS. 7A-7C illustrate a cross-section view of various examples an under-lid support structure 700 designed via a MES technique, whereby curved portions of an under-lid support structure 700 may be designed by free flowing liquid, called Fluent Lens Reactive Media (FLRM) 701. FIG. 7D illustrates a plan view of a lens depicting an under-lid support structure 700 designed via a MES technique. In some embodiments, for example, when utilizing a MES technique a FLRM 701 may be used to form an under-lid support structure 700, as opposed to using a gel included in a Lens Precursor Feature.

Accordingly, in some embodiments, a FLRM 701 may occur in a natural energy state and may "bridge" between two or more Lens Precursor Features 700. In preferred embodiments, for example, FLRM 701 may bridge between two Lens Precursor Features to design an under-lid support structure 700. Furthermore, in some additional embodiments, for example, a Lens Precursor comprising gel features including both a Lens Edge 703 and a lower-lid contact surface 702, may allow design of an under-lid support structure 700 to occur subsequent to, a FLRM 701 bridging a gap between a Lens Edge 703 and a lower-lid contact surface 702 (as shown in FIGS. 7A-7D).

In some other implementations, specified parameters of an under-lid support structure 700 may be based upon a patient's eye data. Additionally, in some embodiments, one or both of shape and thickness of an under-lid support structure 700 may be dependent on one or more of volume of a FLRM 701 available; heights, locations, shapes, and extents of gel features of a Lens Precursor; material properties of a FLRM 701, and a gel; and operating conditions. Accordingly, in some embodiments, one or both of shape and thickness of an under-lid support structure 700 may be one or more of axially uniformly thick, radially uniformly thick, and non uniformly thick.

In yet another aspect of this present invention, a lower-lid contact surface may adjoin an under-lid support structure. Referring now to FIGS. 8A-10D, illustrate examples of multiple variations and Blend Zones of a lower-lid contact surface adjoining an under-lid support structure, and an anterior surface. In some embodiments, a translating multifocal lens may include a lower-lid contact surface, and an under-lid support structure. In some other embodiments, for example, Blend Zones may blend into one or both of a superior anterior portion of a lens and an under-lid support structure (shown in FIGS. 8A-10D). In some additional embodiments, for example, a lower-lid contact surface may include one or more of a zero slope FIGS. 8A-8D, a negative slope FIGS. 9A-9D, and a positive slope FIGS. 10A-10D.

Alternatively, in some additional aspects of the present invention, referring now to FIG. 11, illustrates method steps that may be implemented to form a translating multifocal contact lens. In some embodiments, patient data may be used to implement formation of a translating multifocal contact lens. In one example, eye data may be obtained from various ocular measurement devices such as topographers, wavefront devices, microscopes, video cameras, etc., and the data subsequently stored in various embodiments. In another example, an eye may be examined in various lighting conditions, such as: low, intermediate, and bright lighting conditions, in which any data obtained, may be stored in various embodiments.

In some embodiments, different types of eye data obtained may include, for example, eye shape; lower-lid position relative to an upper-lid, a pupil, and a limbus; pupil, and limbus size, shape, and location at near viewing, intermediate viewing, and distance viewing; and lower-lid radius of curvature, and distance from pupil center. In one example, data obtained from a patient's eye may influence features of this invention such as, a shape of a Lens; shape, size, location, and amount of Stabilization Zones present; shape, size, location, and amount of Optic Zones present; and shape, size, and location of a lower-lid contact surface, and an under-lid support structure of a Lens.

At 1100, a patient's eye measurement data may be input into various embodiments. At 1101, once received, a patient's eye measurement data may be converted by algorithms into usable lens parameters. At 1102, lens parameters may be utilized to define lens features included in a lens. At 1103, a Lens Design may be generated based upon specified lens parameters and lens features. For exemplary purposes, a Lens Design of a lens surface may be based upon parameter data acquired from one or more ocular measurement devices applied to a patient's eye. In some embodiments, for example, size, shape, and location of an optical-power region of a Lens Design may be determined by a patient's pupil movement in various gaze directions. In some other embodiments, for example, shape and location of a lower-lid contact surface may be governed by a patient's lower-lid position and movement. At 1104, a Free-form lens may be created based upon a generated Lens Design.

Referring now to FIG. 12, illustrates a controller 1200 that may be used to implement some aspects of the present invention. A processor unit 1201, which may include one or more processors, coupled to a communication device 1202 configured to communicate via a communication network. The communication device 1202 may be used to communicate, for example, with one or more controller apparatus or manufacturing equipment components.

A processor 1201 may also be used in communication with a storage device 1203. A storage device 1203 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

A storage device 1203 may store an executable software program 1204 for controlling a processor 1201. A processor 1201 performs instructions of a software program 1204, and thereby operates in accordance with the present invention such as, for example, the aforementioned method steps. For example, a processor 1201 may receive information descriptive of a patient's eye data. A storage device 1203 may also store ophthalmic related data in one or more databases 1205 and 1206. A database may include customized Lens Design data, metrology data, and defined lens parameter data for specific Lens Designs.

Conclusion

The present invention, as described above and as further defined by the claims below, provides for a Free-form translating multifocal contacts lens wherein, a lens may include multiple variations of a lower-lid contact surface that may fall within the present invention. In some embodiments, a lens may additionally include an under-lid support structure that may be designed based upon one or more various techniques.

What is claimed is:

1. A translating multifocal contact lens comprising:
    an anterior surface and a posterior surface on a voxel by voxel basis wherein said anterior surface and said posterior surface comprise respective arcuate shapes and meet at a Lens Edge;
    an optical-power region to provide vision correction for an eye of a user wherein said optical-power region comprises multiple Optic Zones;
    a lower-lid contact surface wherein the lower-lid contact surface limits the amount of said Lens translocation upon the eye of the user when the user changes direction of vision and the user's line of sight moves from at least one Optic Zone to another said Optic Zone; and
    an under-lid contact support structure adjoining the lower portion of the lower-lid contact surface and extending to said Lens Edge, the under-lid support structure having an arcuate anterior surface including a concave portion and a convex portion.

2. The translating contact lens of claim 1 wherein the lens comprises a Free-form lens formed on a voxel by voxel basis.

3. The translating contact lens of claim 1 wherein the lower-lid contact surface comprises one contiguous, surface portion that extends laterally across said anterior Lens surface.

4. The translating contact lens of claim 1 wherein the under-lid support structure provides for one or both of vertical stability for the Lens and rotational stability for the Lens.

5. The translating contact lens of claim 1 wherein the anterior surface of the under-lid support structure is described by a function-driven technique.

6. The translating contact lens of claim 5, wherein said function driven technique is a sinusoidal function between a Start Point and an End Point of the under-lid support structure.

* * * * *